United States Patent [19]

Fukasawa

[11] Patent Number: 5,483,050
[45] Date of Patent: Jan. 9, 1996

[54] MAGNETIC MEDIUM PROCESSING APPARATUS

[75] Inventor: Kazuo Fukasawa, Yokohama, Japan

[73] Assignee: Kabushiki Kaisha Toshiba, Kawasaki, Japan

[21] Appl. No.: 306,958

[22] Filed: Sep. 16, 1994

[30] Foreign Application Priority Data

Sep. 16, 1993 [JP] Japan ................................ 5-229961
Aug. 2, 1994 [JP] Japan ................................ 6-181427

[51] Int. Cl.$^6$ .................................................. G06K 7/08
[52] U.S. Cl. ........................... 235/449; 235/384; 235/475
[58] Field of Search ................................ 235/384, 449, 235/475

[56] References Cited

U.S. PATENT DOCUMENTS 3,646,323  2/1972  Young et al. ................... 235/475 X
3,831,188  8/1974  Zupancic et al. ................ 235/475 X
4,287,409  9/1981  Auchinleck ...................... 235/475

FOREIGN PATENT DOCUMENTS

4262485  9/1992  Japan .

*Primary Examiner*—John Shepperd
*Assistant Examiner*—Michael G. Lee
*Attorney, Agent, or Firm*—Cushman Darby & Cushman

[57] ABSTRACT

A magnetic medium processing apparatus includes a magnetism reading head for reading magnetic data recorded in a ticket, a peak value detector for detecting peak values of a signal output from the reading head, and a display for displaying the digital peak values detected by the peak value detector. Monitoring the state of reading by the reading head prevents unstable reading of magnetic data irrespective of whether the reading head is worn out.

13 Claims, 7 Drawing Sheets

| AMOUNT OF CHANGE (%) | AMOUNT OF MOVEMENT (mm) |
|---|---|
| 0 | 0 |
| 10 | 0.01 |
| 20 | 0.2 |
| 30 | 0.5 |
| ⋮ | ⋮ |

MAGNETIC MEDIUM PROCESSING APPARATUS

BACKGROUND OF THE INVENTION

1. Field of the Invention

This invention relates to an automatic, checking and collecting machine, and more particularly to a magnetic recording medium processing apparatus built in the automatic checking and collecting machine for reading magnetic bit data stored in a ticket, etc., and processing the read data.

2. Description of the Related Art

Recently, automatic checking and collecting machines have been installed in many stations to enhance the efficiency of checking tickets. These machines read magnetic bit data stored in a ticket carried by a passenger with the use of a magnetic data reading apparatus employed therein, thereby judging whether the ticket is valid or invalid, as is disclosed, for example, in Jpn. Pat Appln. KOKAI Publication No. 4-262485.

In the magnetic data reading apparatus, a reading head is opposed to a roller with a predetermined space therebetween. A magnetic recording medium such as a ticket is inserted into the space between the reading head and the roller, and magnetic bit data recorded therein is read by the magnetic head. The magnetic head in turn outputs an analog voltage which varies in accordance with whether or not magnetic bit data has been supplied from the head.

The output of the magnetic head is amplified by an amplifier and then input to a peak detecting circuit, where peak values of the bit signal are detected, and time points at which the peak values are detected are determined. The bit signal is demodulated by a data demodulating circuit at time points, at which the peak values having levels higher than a predetermined slice level have been detected by the peak detecting circuit. Thus, the contents of the magnetic bit data are analyzed. In other words, it is determined whether or not the magnetic bit data recorded in the ticket is valid. As described above, in the conventional magnetic data reading apparatus, a voltage signal supplied from the magnetic head is subjected to analog processing, to detect the time points of occurrence of its peaks and analyze the recorded magnetic bit data.

A ticket storing magnetic data is transferred at a high speed of about 2 m/s through the automatic checking and collecting machine by means of a transfer mechanism employed therein. At this time, the magnetic head cannot accurately read or write magnetic data unless the ticket is appropriately pressed against the magnetic head by a roller which is opposed to the head. Disadvantageously, the magnetic head is liable to be worn out due to friction between itself and the ticket or magnetic recording medium. If the distance between the roller and the magnetic head varies as a result of the wear, the ticket cannot be pressed against the magnetic head by a predetermined force, and hence the magnetic data may be erroneously read. To avoid such erroneous reading, a technique for adjusting the distance between the roller and the magnetic head by moving the roller toward the magnetic head is disclosed. However, this adjustment is performed only manually.

SUMMARY OF THE INVENTION

The present invention has been developed in view of the above circumstances, and aims to provide a magnetic medium processing apparatus capable of detecting an unstable reading state of magnetic data due to friction of a magnetic head, etc.

To attain the aim, there is provided an automatic checking and collecting machine for processing a magnetic card storing magnetic data which has magnetism inverting portions, comprising:

transfer means for receiving and transferring the magnetic card;

a magnetic head for reading the magnetic data stored in the magnetic card transferred by the transfer means, and outputting a signal indicative of the read magnetic data;

press means opposed to the magnetic head for pressing the magnetic card against the magnetic head;

judging means for judging, on a basis of the signal from the magnetic head, whether or not the magnetic data satisfies conditions for passage through the automatic checking and collecting machine;

first detecting means for detecting those peak values of the signal from the magnetic head, which correspond to the magnetism inverting portions of the magnetic card, respectively;

second detecting means for detecting changes in the peak values detected by the first detecting means; and moving means for moving the press means toward the magnetic head on a basis of the changes detected by the second detecting means.

The above structure enables the reading state of the magnetic head to be monitored, and prevents an unstable state of reading due to wear of the magnetic head, etc.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
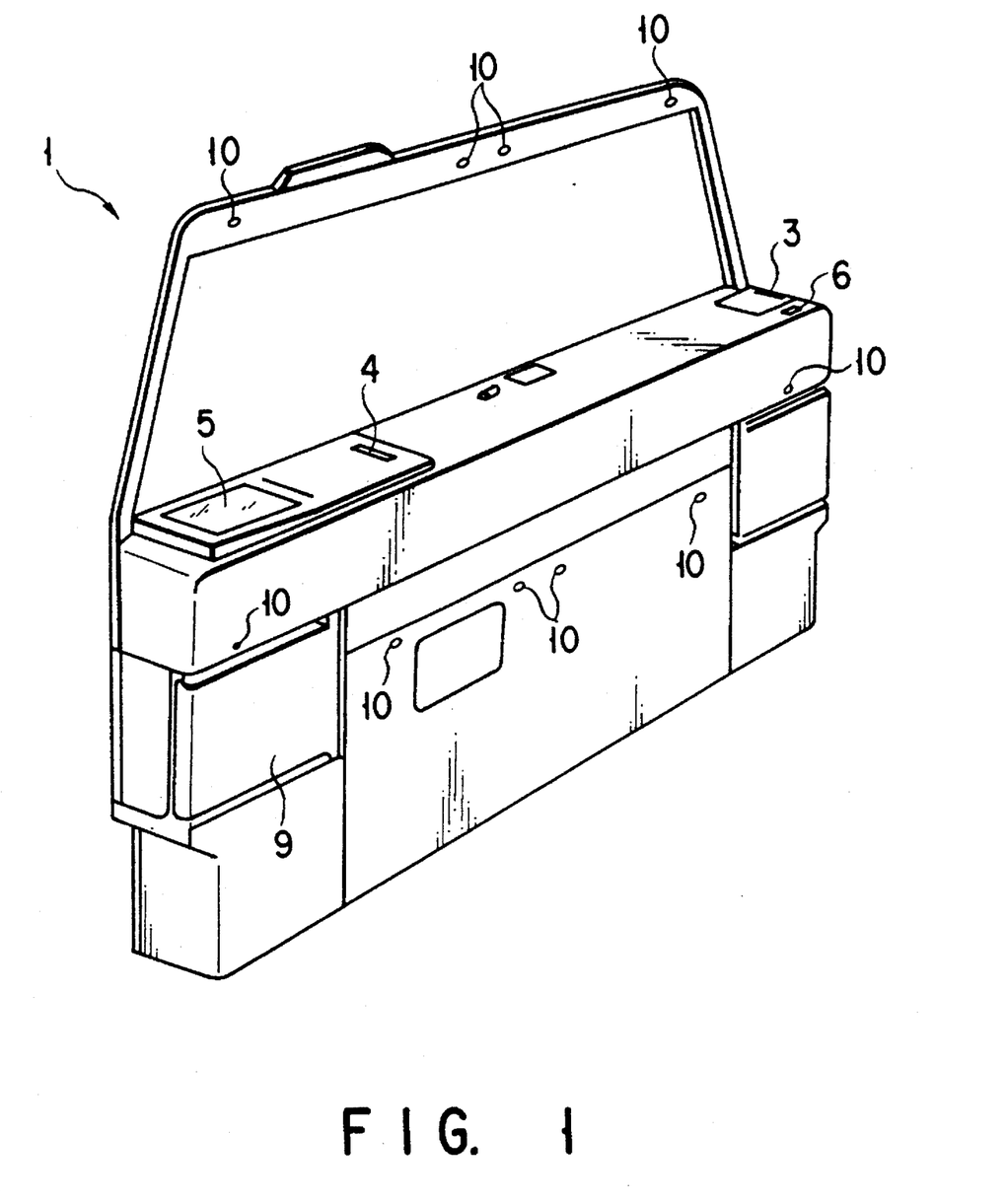
FIG. 1 is a schematic view, showing the appearance of an automatic checking and collecting machine having a magnetic data processing apparatus according to the invention.

A magnetic medium processing apparatus according to the invention will be explained with reference to the accompanying drawings. FIG. 1 is a schematic view, showing the appearance of an automatic checking and collecting machine which employs a magnetic medium processing apparatus according to the invention. The magnetic medium processing apparatus is applicable to an automatic checking and collecting machine installed in a station for admitting the entrance/exiting of passengers. Magnetic recording mediums or tickets such as a pass, a coupon ticket, a stored fare card, etc., in which effective route, life time and/or residual units are recorded, are inserted through an inlet 3 and discharged from an outlet 4. A display section 5 displays the guidance of operation, the peak value of each magnetic data bit, etc.

A door unit 9 is provided on a side of the main body 1 of the automatic checking and collecting apparatus, for inhibiting the pass of a passenger by closing itself when the passenger has inserted a wrong ticket into the inlet 3. Passenger detectors 10 are provided on a side surface and an upper portion of the main body 1, for detecting the pass of a passenger. Each detector 10 is of a transmission type or of a reflection type. In the case of the transmission type, light emitted from the light emitting section of another device opposed to the detector is guided thereto.

Figure 2:
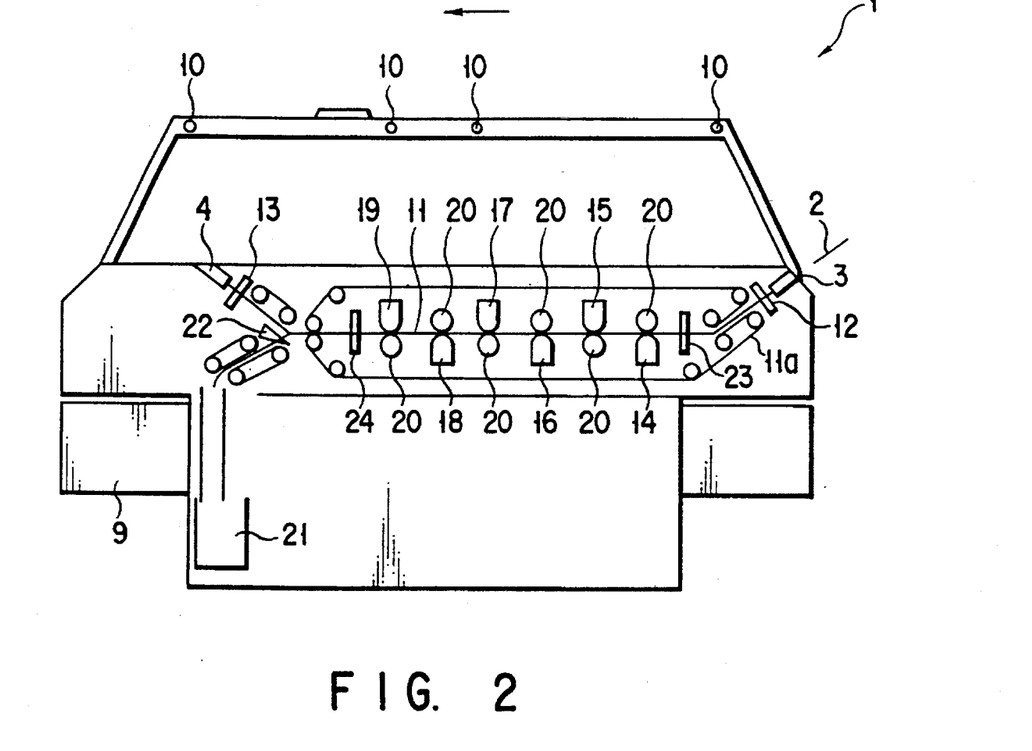
FIG. 2 is a longitudinal sectional view, showing the inner structure of the machine of FIG. 1.

Referring then to FIG. 2, the inner mechanism of the main body 1 will be explained briefly. A transfer path 11 is provided between the inlet 3 and the outlet 4, for transferring a ticket 2 from the inlet 3 to the outlet 4. A transfer mechanism 11a consisting of a roller and a belt transfers the ticket 2 along the transfer path 11. A detector 12 is provided at the inlet 3 for detecting the insertion of the ticket 2 therethrough, while a detector 13 is provided at the outlet 4 for detecting the discharge of the ticket 2 therethrough.

A ticket aligning section (not shown), reading heads 14 and 15 for reading magnetic bit data, writing heads 16 and 17 for recording magnetic data, and reading heads 18 and 19 are provided in this order along the transfer path 11 from the inlet 3 toward the outlet 4. The reading heads 14 and 15 read encoded magnetic bit data recorded in a magnetic recording layer formed on one side of the ticket 2. The head 14 reads the magnetic data from the magnetic recording layer when the side on which the layer is formed is directed downward, while the head 15 does it when the side is directed upward.

The writing heads 16 and 17 record the encoded magnetic bit data in the magnetic recording layer. The head 16 records the bit data when the side on which the magnetic recording layer is formed is directed downward, while the head 17 does it when the side is directed upward. The reading heads 18 and 19 read the encoded magnetic bit data recorded by the writing head 16 or 17. The head 18 reads the recorded magnetic data when the side on which the magnetic recording layer is formed is directed downward, while the head 19 does it when the side is directed upward.

A rotary roller 20 is provided along the path 11, opposed to each of the reading heads 14 and 15, the writing heads 16 and 17 and the reading heads 18 and 19. Each roller 20 presses the ticket 2 toward corresponding one of the reading/writing heads 14–19. Further, a distributor 22 is provided along the path 11 for guiding the ticket 2 to the outlet 4 if it is determined that the ticket 2 should be discharged through the outlet 4, and guiding the ticket 2 to a collecting unit 21 if the ticket 2 should be collected. Detectors 23 and 24 are provided along the path 11 for detecting the pass of the ticket 2.

Figure 3:
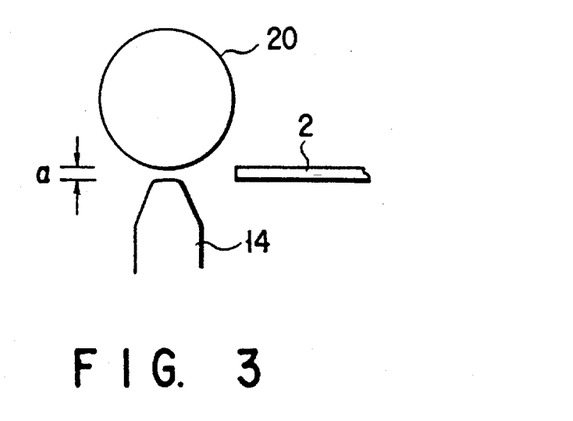
FIG. 3 is an enlarged view, showing a roller and a reading head employed in the machine of FIG. 1.

FIG. 3 is an enlarged view, showing the roller 20 and the reading head 14. The roller 20 is generally made of a rubber, and a predetermined distance d is interposed between the roller 20 and the head 14, as is shown in FIG. 3. A magnetic recording medium, i.e., the ticket 2, is inserted into the distance d, and magnetic bit data recorded in the ticket 2 is read by the head 14. The head 14 in turn outputs an analog voltage which varies in accordance with the magnetic bit data recorded in the ticket 2.

Figure 4:
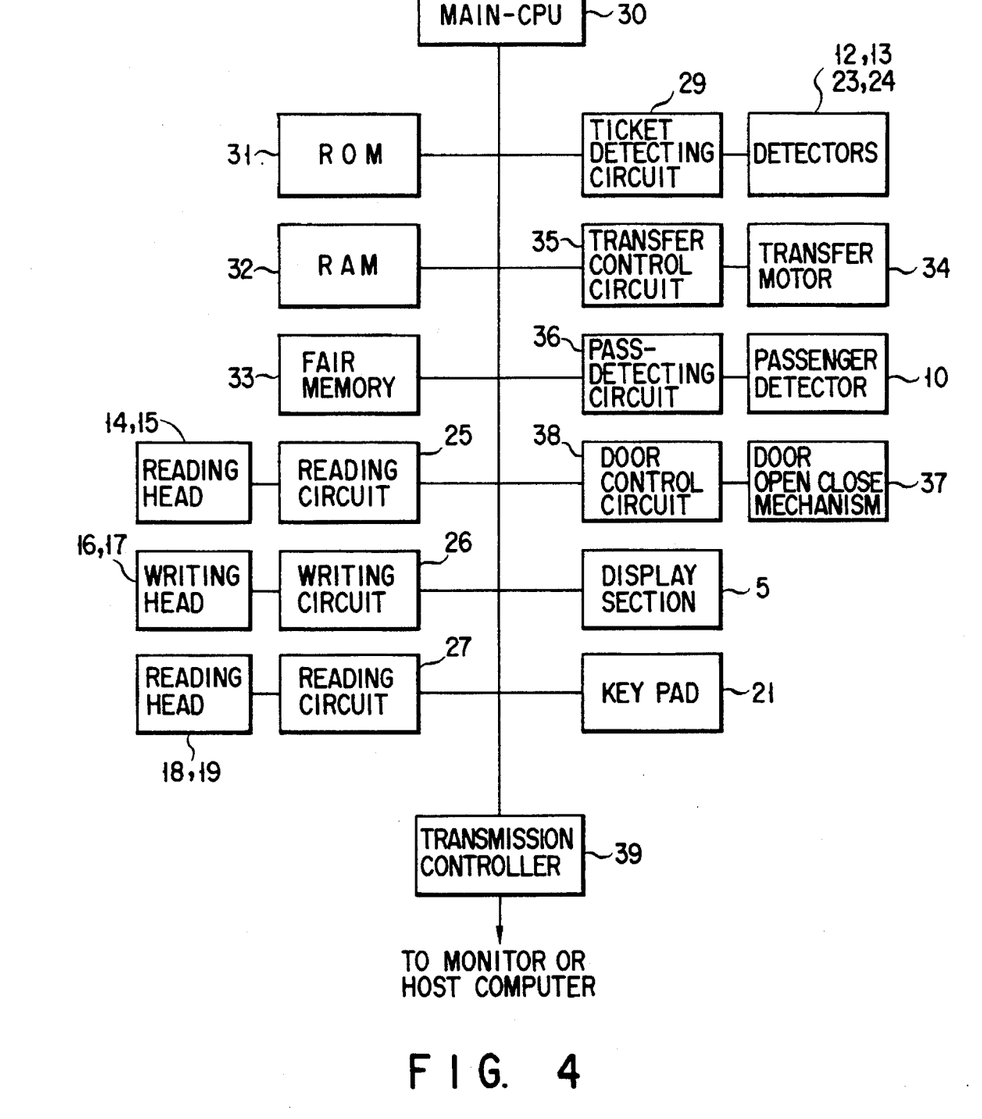
FIG. 4 is a block diagram, showing an electrical structure of the machine of FIG. 1.

FIG. 4 is a schematic block diagram, showing a control system incorporated in the automatic checking and collecting machine constructed as shown in FIG. 2. A main central processing unit (hereinafter called simply a "main CPU") 30 controls the overall checking and collecting machine, a read only memory (hereinafter called a "ROM") 31 stores control programs for the main CPU 30, and a random access memory (hereinafter called a "RAM") 32 serves as a memory for storing data read from the ticket 2 and as a control program working area. A fare memory 33 stores fare data concerning a fare required for a passage from any other entrance station to the present station at which the main body 1 is installed. The reading heads 14–17 detect data recorded in the ticket 2 and convert the data to an analog electric signal. Reading circuits 25 and 26 convert the analog signal to a digital signal, and then transmit the peak values of the digital signal to the main CPU 30. The main CPU 30 digitizes the peak values of the digital signal with reference to a predetermined slice level, thereby demodulating/judging magnetic bit data. The thus demodulated bit data is judged with the use of a judging program stored in the ROM 31. If it is judged that the bit data satisfies predetermined conditions such as effective route, life time and/or residual units, the ticket 2 is judged to have been correctly used. The writing heads 16 and 17 modulate data indicative of completion of judgment and transmitted from the main CPU 30 via the writing circuit 26, on the basis of the judgment of the main CPU 30, and write the modulated data into the ticket 2. A ticket detecting circuit 29 detects the state of transfer of the ticket 2 on the basis of the outputs of the detectors 12, 13, 23 and 24. A transfer motor 34 transfers the ticket 2 along the transfer path 11 under the control of a transfer control circuit 35. A pass detection circuit 36 detects the pass of a passenger, who has inserted the ticket 2 into the machine, on the basis of outputs from the passenger detectors 10. A door control circuit 38 as gate means controls a door opening/closing mechanism 37 to drive the door unit 9. If it is judged that the ticket 2 has been correctly used, the door is opened to allow the passenger with the ticket 2 to pass therethrough, whereas if it is judged that the ticket 2 has not correctly been used, the door is closed. Data is transmitted between a transmission control circuit 39 and a host computer for controlling the checking and collecting machine 1 or a monitor (not shown). A key pad 21 is used to send to the main CPU 30 data or a command which is necessary when the operator performs, for example, the maintenance of the machine. The display section 5 displays a sign indicative of whether the ticket 2 inserted through the inlet 3 is valid or invalid, a peak value of a bit signal indicative of magnetic bit data, and a sign indicative of an input key of the key pad The operation of the above-described first embodiment of the invention will now be explained. As is shown in FIG. 2, the ticket 2 is inserted into the main body 1 through the inlet 3, and transferred along the path 11 at a speed of about 2 m/s. Then, the ticket 2 is positioned between the roller 20 and the reading head 14 as shown in FIG. 3, where magnetic data recorded in the ticket 2 is read by the reading head 14 and converted to an electric signal. In other words, the reading head 14 outputs a voltage signal corresponding to the magnetic data.

Figure 5:
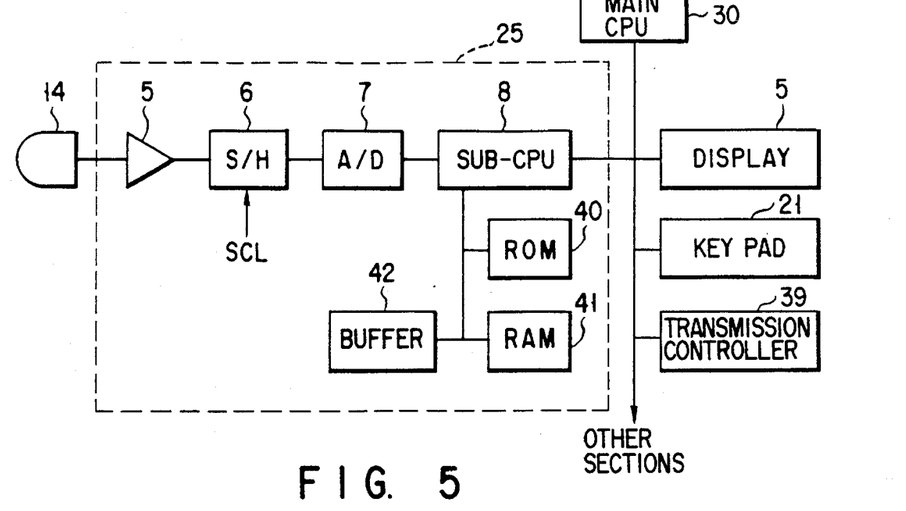
FIG. 5 is a view, useful in explaining the magnetic medium processing apparatus of the invention.

FIG. 5 is a view, useful in explaining the magnetic medium processing unit 25 according to the invention. The analog electric signal output from the reading head 14 is amplified by an amplifier 57, and sampled by a sample hold circuit 6 with the use of a predetermined sample clock SCL. The sampled signal is input to an A/D converter 7, where it is subjected to A/D (Analog/Digital) conversion. The converter 7 outputs digital signals at regular sampling intervals. These digital signals are transmitted to a sub CPU 8. A ROM 40 stores programs to be executed by the sub CPU 8, and a RAM 41 has a work area necessary to execute the programs. The sub CPU 8 detects local maximum and local minimum values, i.e. peak values in units of magnetic bit data, and successively supplies the values to a buffer 42. The peak values stored in the buffer 42 are displayed on the display section 5 via the main CPU 30, and output to the monitor or the host computer located outside the machine 1.

Figure 6A:
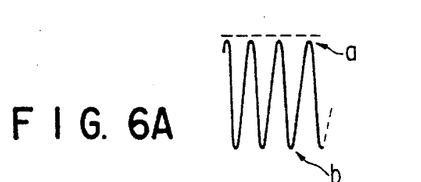
FIGS. 6A–6C are views, showing voltage waveforms (6A and 6B) output from the magnetic head where the distance between the roller and the magnetic head falls within a normal range, and a display state (6C) of a display section assumed at this time.
Figure 6B:
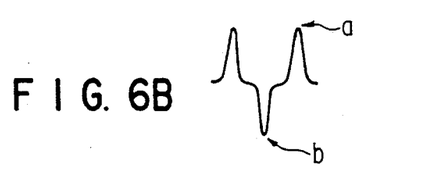
Figure 6C:
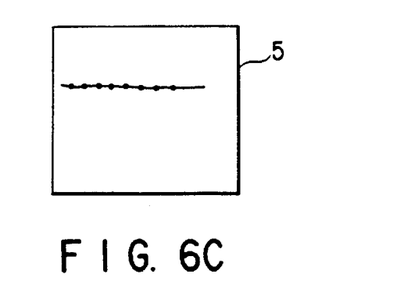

FIGS. 6A and 6B show examples of the waveforms of analog signals output from the reading head 14. More specifically, FIG. 6A shows a waveform and envelope of a signal obtained when the ticket is transferred at a high speed, while FIG. 6B shows a waveform of a signal obtained when it is transferred at a low speed. In these waveforms, an upper peak point a and a lower peak point b indicate those portions of the signal (data) recorded in its magnetic recording portion, at which the polarity of magnetism is inverted. FIG. 6C shows an envelope of peak values displayed on the display section 5. As is shown in FIG. 6A or 6B, the amplitude of the signal voltages, or peak values of each magnetic bit, output from the reading head 14 is kept constant, if the distance between the roller 20 and the reading head 14 is kept constant, because of a constant force pressing the ticket against the head. As a result, the peak values calculated by the sub CPU 8 are kept constant, and hence the peak value displayed on the display section 5 is constant as shown in FIG. 6C.

Figure 7A:
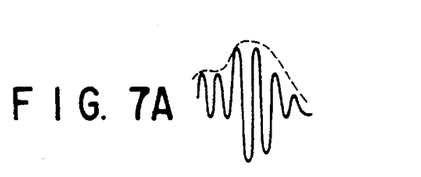
FIGS. 7A–7C are views, showing voltage waveforms (7A and 7B) output from the magnetic head where the distance between the roller and the magnetic head falls within an abnormal range, and a display state (7C) of a display section assumed at this time.
Figure 7B:
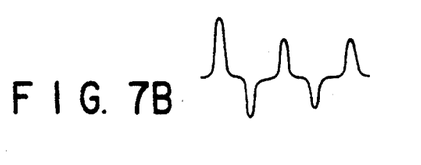
Figure 7C:
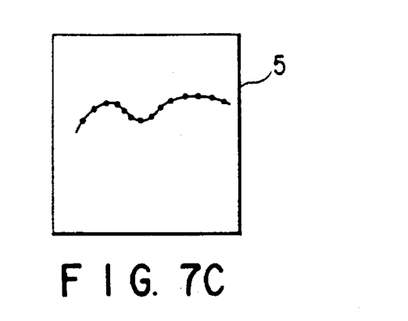

However, where the distance between the roller 20 and the reading head 14 increases due to the wear of the head, etc., the ticket 2 transferred by the transfer mechanism 11a vibrates up and downwards between the roller 20 and the head 14 during the transfer. In other words, the force pressing the ticket against the head 14 varies, and hence the amplitude of a voltage signal output from the head 14 varies as shown in FIGS. 7A and 7B. Accordingly, peak values calculated by the sub CPU 8 in units of a magnetic bit vary as shown in FIG. 7C.

As described above, in the magnetic medium processing apparatus of the invention, the peak values of a signal output from the reading head 14 is displayed on the display section 5. At the time of a maintenance operation, for example, the operator operates the key pad 21 to send to the main CPU 30 a command for causing the CPU 30 to display the peak value on the display section 5. As a result, the peak value is displayed on the display section 5, and therefore the operator can monitor the occurrence of an abnormality in the reading head 14.

Figure 8:
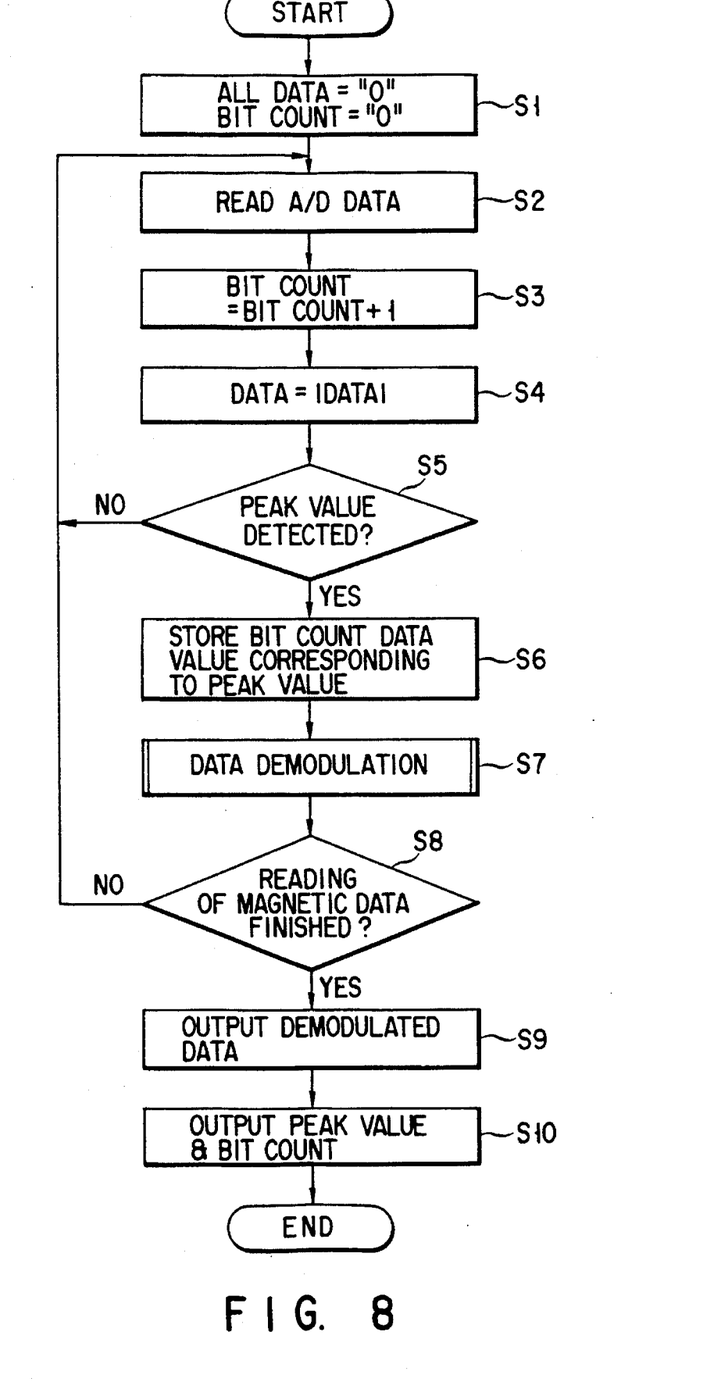
FIG. 8 is a flowchart, illustrating a program to be executed by a magnetic data reading section.
Figure 9A:
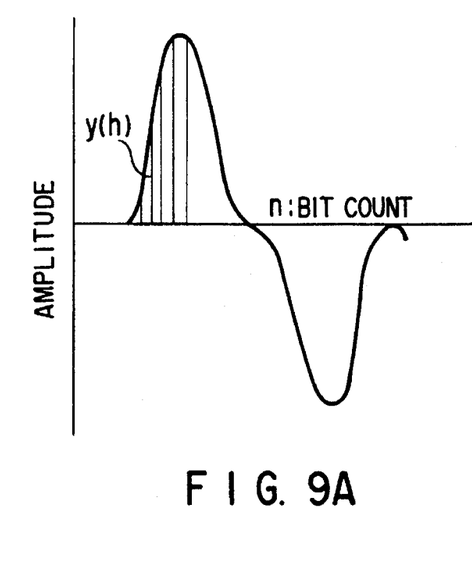
FIGS. 9A and 9B are views, useful in explaining the operation of a peak value detecting circuit according to the invention.

FIG. 8 is a flowchart, illustrating a program executed by the sub CPU 8. This program is stored in the ROM 40. First, the sub CPU 8 initializes all associated data (step S1). Specifically, all peak values stored in the data areas are set to "0", and all bit count values corresponding to a sampling period are set to "0". In a step S2, the digital value of a signal output from the A/D converter 7 is read, and in a step S3, +1 is added to the bit count value. In a step S4, the absolute digital value of a signal output from the A/D converter 12. In other words, a voltage V(n) corresponding to a bit count value "n" is calculated as shown in FIG. 9A, and stored in the RAM 41. In a step S5, it is determined on the basis of the value stored in the RAM 41 whether or not a peak has been detected. Specifically, local minimum and local maximum values of the amplitude are determined by comparing the present voltage v(n) with the previous voltage v(n−1). The local minimum or local maximum value corresponds to v(n−1) obtained when the plus or minus sign of a subtraction value (v(n)−v(n−1)) is inverted. If it is determined that no peak has occurred, the program returns to the step S2, where the next sample is read.

Figure 9B:
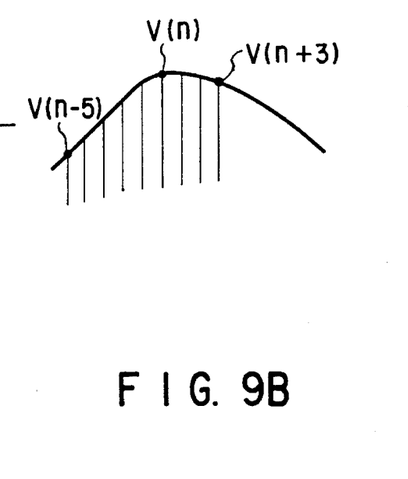

When the operations in the steps S2–S5 have been repeated, a peak value V(n) as shown in FIGS. 9A and 9B (FIG. 9B is an enlarged view of FIG. 9A) is detected in the step S5. In a step S6, the detected peak value V(n) and the bit count value n are recorded in a buffer 42. In a step S7, the value stored in the buffer 42 is demodulated, and it is judged in a step S8 whether or not the reading of magnetic data is completed, thereby determining whether the processing of the ticket 2 has been completed. If the answer to the question of the step S8 is No, the program returns to the step S2, where the next peak value of the signal output from the A/D converter 7 is read. Thus, digital peak values obtained by subjecting to A/D conversion an analog voltage signal output from the magnetic head 14 are successively stored in the buffer 42 by means of the sub CPU 8.

If the answer to the question of the step S8 is Yes, demodulated data is output in a step S9, and the peak values and corresponding bit count values stored in the buffer 42 are output to the main CPU 30 in a step S10. As a result, images as shown in FIGS. 6C and 7C are displayed on the display section 5.

In a second embodiment of the invention, statistical processing can be performed with the use of the results obtained in the first embodiment. Specifically, an upper limit of the frequency of occurrence of abnormality in reading signal is set in the second embodiment. When abnormality has occurred a number of times which exceeds the upper limit, maintenance data instructing the operator to perform predetermined maintenance operations is transmitted to the host computer or the monitor via a transmission controller 39.

A third embodiment of the invention will be explained with reference to FIGS. 10 and 11. In this embodiment, when an abnormality has been detected in a signal output from the reading head 14, i.e, when a unstable reading state is detected, the main CPU 30 judges that the space between the roller 20 and the reading head 14 is enlarged due to the wear of the head 14, etc., thereby moving the roller 20 toward the head 14 by the use of a driving unit via a driving control section 44a.

Figure 10:
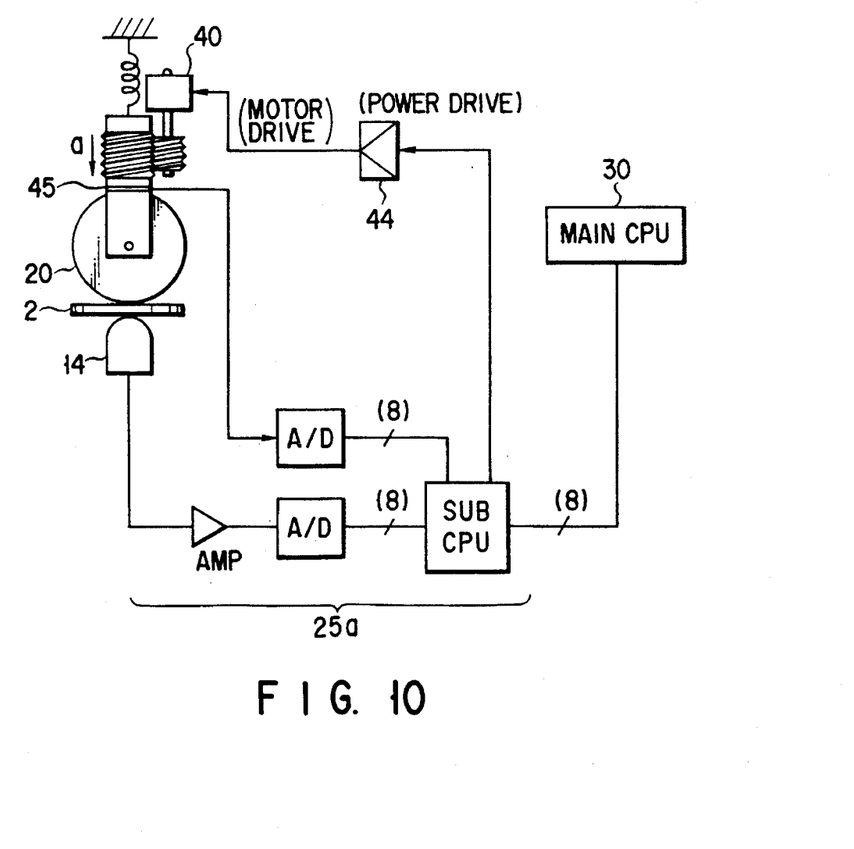
FIG. 10 shows a structure according to the invention, provided for automatically adjusting the distance between the roller and the magnetic head.
Figure 11:
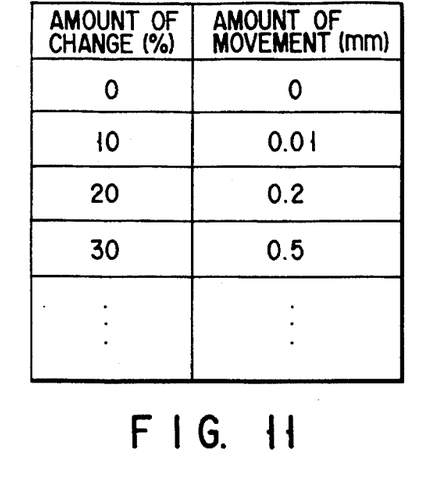
FIG. 11 is a look-up table, showing the relationship between a change in the level of a signal and the amount of movement of the roller.

FIG. 10 is a view, useful in explaining the process of moving the roller 20 toward the head 14. Since a reading circuit 25a has a structure similar to the reading circuit 25, no detailed explanation is given of it. The ROM 40 in the reading circuit 25a has a table as shown in FIG. 11. The table shows the relationship between the required amount of movement of a roller 43 and a change in peak value in units of a magnetic bit. The peak value is represented by the A/D conversion value of the output signal voltage against to a reference voltage.

Figure 12:
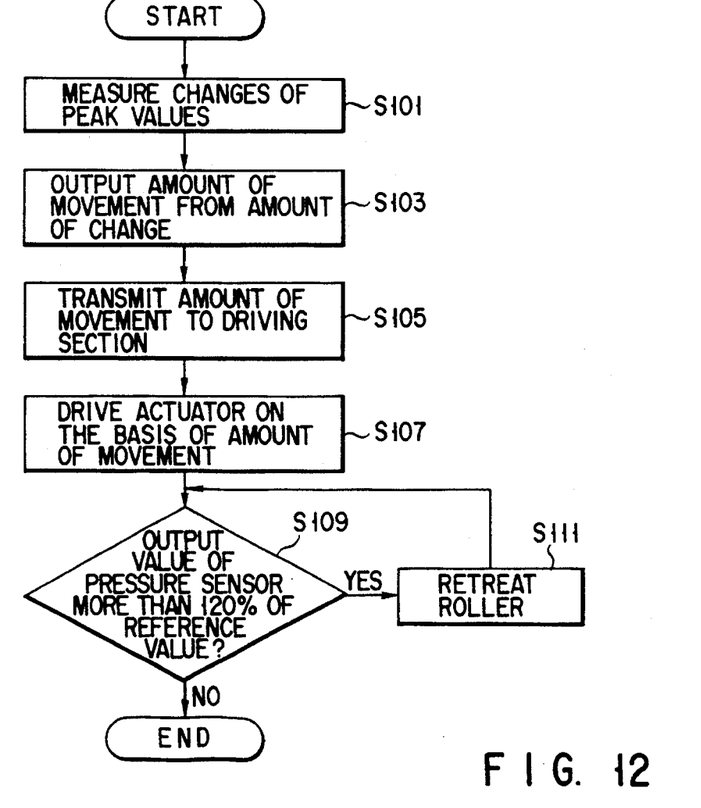
FIG. 12 is a flowchart illustrating a control program for moving the roller.

FIG. 12 is a flowchart illustrating a control program for moving the roller 20. First, a change in peak value in units of a magnetic bit is measured (step S101). Thereafter, the amount of movement of the roller 20 corresponding to the change in peak value is output with reference to the table of FIG. 11 (step S103). If the difference between the maximum value of peak values and the minimum value of the peak values varies by 10% with respect to the maximum value, the sub CPU 8 provides a signal instructing the section 44 to move the roller 20 by 0.01 mm. This signal is supplied to a driving section 44 by means of the main CPU 30 (step S105). In response to the signal, the driving section 44 drives an actuator 43 to move the roller 20 toward the reading head 14 (step S107). In this case, the actuator 43 is controlled so as to drive the roller 20 to move by 0.1 mm. The actuator 43 comprises a motor, rack and pinion gear. In accordance with the rotation of the motor, the roller is moved in a direction indicated by arrow a. The roller 20 can be moved in a direction opposite to the direction indicated by arrow a. Further, when the actuator 43 has moved the roller 20 too close to the reading head 14, the actuator 43 is controlled so as to retreat the roller 20 from the head 14. A pressure sensor 45 is attached to a portion of the gear in order to adjust the distance between the roller 20 and the head 14. The pressure sensor 45 senses the ticket-pressing force of the roller 20 against the reading head 14. When there is no ticket between the head 14 and the roller 20, the pressure sensor 45 outputs a 0-level signal, since the roller 20 does not contact the head 14 via the ticket. Further, at the time of initializing the automatic checking and collecting machine, the distance between the roller 20 and the head 14 is set so that a magnetic signal output from the ticket 2 can have peak values as shown in FIG. 6C. The output value of the pressure sensor 45 generated when the signal of the ticket has the peak values shown in FIG. 6C is set as a reference pressure value. If the output value of the pressure sensor 45, generated when the head 14 has read the magnetic signal of the ticket 2 after the roller 20 has been moved relative to the head 14, is more than about 120% of the reference pressure value (step S109), the sub CPU 8 judges that the roller 20 has been moved too close to the head 14, thereby causing the driving unit 44 and the actuator 43 to retreat the roller 20 from the head 14 (step S111). The amount of retreat at a time is set equal to the amount of movement assumed when a change is 10%, or more preferably set to a value lower than the equal value. If the output value of the pressure sensor 45 is less than 120% of the reference pressure value, the operation of the actuator is ceased, and the program returns to the processing according to the FIG. 8 flowchart.

The sub CPU 8 detects the peak values of a signal output from the reading head 14 in a manner similar to that employed in the first embodiment, and controls the actuator 43 so that a change in peak value can be minimized. As a result, the distance between the roller 20 and the reading head 14 is controlled to an optimal value at all times. In other words, since the output level of a magnetic bit signal from the reading head 14 is stabilized, no reading error occurs even when it is determined with the use of a predetermined slice level whether or not a signal exists, thus enabling correct reading operation of a signal.

Although in the first embodiment, the peak values of a signal output from the reading head 14 are displayed on the display section 5, the invention can be modified such that an alarm indicating that the reading head 14 is worn out is generated to a monitor located outside the main body when a change in peak value falls outside a set range. Further, the invention is not limited to a magnetism reading apparatus for use in a checking and collecting machine, but is also applicable to a magnetism reading apparatus for reading a prepaid card, etc.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An automatic checking apparatus for checking magnetic data stored in a magnetic card, comprising:

transfer means for transferring the magnetic card;

a magnetic head for reading the magnetic data stored in the magnetic card transferred by the transfer means, and outputting a magnetic signal indicative of the read magnetic data;

press means opposed to the magnetic head for pressing the magnetic card against the magnetic head;

judging means for judging, on a basis of the magnetic signal from the magnetic head, whether or not the magnetic data satisfies conditions for passage through the automatic checking apparatus;

first detecting means for detecting those peak values of the magnetic signal from the magnetic head, respectively;

second detecting means for detecting changes in the peak values detected by the first detecting means; and moving means for moving the press means toward the magnetic head on a basis of the changes detected by the second detecting means.

2. The apparatus according to claim 1, further comprising:

a key pad for inputting a command;

an analog to digital converter for converting an analog electric signal to a digital signal, the magnetic head converting the magnetic data stored in the magnetic card to an analog electric signal indicative of the magnetic data, the analog to digital converter converting the analog electric signal output from the magnetic head to a digital signal;

calculating means for calculating, as peak values, the absolute values of the local minimum values and the local maximum values of the digital signal output from the analog to digital converter;

peak value storing means for storing the peak values calculated by the calculating means; and display means for displaying the peak values stored in the peak value storing means, in response to a command input via the key pad.

3. The apparatus according to claim 1, further comprising:

judging means for judging whether or not the peak values from the first detecting means fall within a predetermined range, and supplying a judging result; and maintenance data creating means for creating maintenance data on a basis of the judging result supplied from the judging means.

4. The apparatus according to claim 3, further comprising maintenance data display means for displaying the maintenance data supplied from the maintenance data creating means.

5. The apparatus according to claim 3, further comprising:

memory means for storing those amounts of movement of the press means which correspond to changes of the peak values detected by the first detecting means; and output means for outputting the amounts of movement corresponding to the changes detected by the second detecting means, with reference to the amounts of movement stored in the memory means;

wherein the moving means has movement control means for moving the press means toward the magnetic head on a basis of each of the amount of movement output from the output means.

6. A magnetic card processing apparatus comprising:

magnetism reading means for reading magnetic data stored in the magnetic card;

a roller, opposed to the reading means with a space therebetween, for pressing the magnetic card against the magnetism reading means;

driving means for moving the roller in a direction in which the space is narrowed;

peak value detecting means for detecting peak values of a magnetic signal corresponding to magnetic data read by the magnetism reading means, the peak values corresponding to the magnetic data;

change detecting means for detecting changes of the peak values detected by the peak value detecting means; and control means for controlling the driving means in accordance with the changes of the peak values detected by the change detecting means, in order to keep the space between the roller and the reading means at a predetermined value.

7. The apparatus according to claim 6, wherein the magnetism reading means includes:

a magnetic head for converting the magnetic data recorded in the magnetic card to an analog electric signal indicative of the magnetic data; and an analog to digital converter for converting the analog electric signal from the magnetic head to a digital signal;

and wherein the peak value detecting means includes:

calculating means for calculating, as the peak values, the absolute values of the local minimum values and the local maximum values of the digital signal output from the analog to digital converter;

peak value storing means for storing the peak values calculated by the calculating means; and transmitting means for transmitting the peak values from the peak value storing means to the control means.

8. The apparatus according to claim 6, further comprising:

memory means for storing those amounts of movement of the roller which correspond to changes of the peak values detected by the peak value detecting means; and output means for outputting the amounts of movement corresponding to the changes detected by the peak value detecting means, with reference to the amounts of movement stored in the memory means;

wherein the moving means has movement control means for moving the roller toward the magnetic head on a basis of each of the amounts of movement output from the output means.

9. The apparatus according to claim 8, further comprising:

judging means for judging whether or not the peak values from the first detecting means fall within a predetermined range, and supplying a judging result; and maintenance data creating means for creating maintenance data on a basis of the judging result supplied from the judging means.

10. The apparatus according to claim 9, further comprising maintenance data display means for displaying the maintenance data supplied from the maintenance data creating means.

11. An automatic checking apparatus for checking magnetic data stored in a magnetic card, comprising:

transfer means for receiving and transferring the magnetic card;

a magnetic head for reading the magnetic data stored in the magnetic card transferred by the transfer means;

press means opposed to the magnetic head for pressing the magnetic card against the magnetic head;

judging means for judging, on a basis of the signal from the magnetic head, whether or not the magnetic data satisfies conditions for passage through the automatic checking apparatus;

first detecting means for detecting those peak values of the signal from the magnetic head, respectively;

second detecting means for detecting changes in the peak values detected by the first detecting means;

first moving means for moving the press means toward the magnetic head on a basis of the changes detected by the second detecting means;

measuring means for measuring the pressing force of the press means by which the magnetic head is pressed, after the press means is moved by the first moving means; and second moving means for moving the press means to widen the space between the magnetic head and the press means when the pressing force measured by the measuring means exceeds a predetermined value.

12. The apparatus according to claim 11, further comprising:

a key pad for inputting a command;

an analog to digital converter for converting an analog electric signal to a digital signal, the magnetic head converting the magnetic data stored in the magnetic card to an analog electric signal indicative of the magnetic data, the analog to digital converter converting the analog electric signal output from the magnetic head to a digital signal;

calculating means for calculating, as peak values, the absolute values of the local minimum values and the local maximum values of the digital signal output from the analog to digital converter;

peak value storing means for storing the peak values calculated by the calculating means; and display means for displaying the peak values stored in the peak value storing means, in response to a command input via the key pad.

13. The apparatus according to claim 11, further comprising:

memory means for storing those amounts of movement of the press means which correspond to changes of the peak values detected by the first detecting means; and output means for outputting the amounts of movement corresponding to the changes detected by the second detecting means, with reference to the amounts of movement stored in the memory means;

wherein the moving means has movement control means for moving the press means toward the magnetic head on a basis of each of the amount of movement output from the output means.

* * * * *